United States Patent
Lutz et al.

(10) Patent No.: US 8,928,198 B2
(45) Date of Patent: Jan. 6, 2015

(54) BRUSHLESS PM MACHINE CONSTRUCTION ENABLING LOW COERCIVITY MAGNETS

(75) Inventors: Jon Lutz, Westminster, CO (US); Josh Ley, Erie, CO (US)

(73) Assignee: UQM Technologies Inc., Longmont, CO (US)

( * ) Notice: Subject to any disclaimer, the term of this patent is extended or adjusted under 35 U.S.C. 154(b) by 0 days.

(21) Appl. No.: 13/407,084

(22) Filed: Feb. 28, 2012

(65) Prior Publication Data

US 2012/0217834 A1    Aug. 30, 2012

Related U.S. Application Data

(60) Provisional application No. 61/447,280, filed on Feb. 28, 2011.

(51) Int. Cl.
| | |
|---|---|
| *H02K 21/12* | (2006.01) |
| *H02K 15/03* | (2006.01) |
| *H02K 1/27* | (2006.01) |

(52) U.S. Cl.
CPC ............ *H02K 1/2753* (2013.01); *H02K 1/2766* (2013.01)
USPC ............ 310/156.39; 310/156.43; 310/156.53; 310/156.18

(58) Field of Classification Search
CPC ....................................................... H02K 1/276
USPC ............. 310/156.43, 153.53, 156.18, 156.56, 310/156.23, 156.39, 156.12
See application file for complete search history.

(56) References Cited

U.S. PATENT DOCUMENTS

| | | | |
|---|---|---|---|
| 3,068,373 A | 12/1962 | Bekey | |
| 4,358,696 A | 11/1982 | Liu et al. | |
| 4,358,697 A | 11/1982 | Liu et al. | |
| 4,580,335 A | 4/1986 | Laing et al. | |
| 5,369,323 A * | 11/1994 | Allwine, Jr. | 310/49.54 |
| 6,684,483 B2 | 2/2004 | Rahman et al. | |
| 6,703,746 B2 | 3/2004 | Biais et al. | |

(Continued)

FOREIGN PATENT DOCUMENTS

| | | |
|---|---|---|
| CN | 1707911 A | 12/2005 |
| EP | 2 299 558 A1 | 3/2011 |

(Continued)

OTHER PUBLICATIONS

Pal, "Comparative Study of the Design and Manufacturing Processes of Electrical Motors with Low and High Energy Permanent Magnets", pp. 339-346.

(Continued)

*Primary Examiner* — Terrance Kenerly
(74) *Attorney, Agent, or Firm* — Buchanan Ingersoll & Rooney PC

(57) ABSTRACT

The present disclosure provides a brushless permanent magnet machine which includes an essentially circular shaped rotor, and a pair of magnets arranged in the rotor. The magnets are each U-shaped and have a thickness direction extending along a contour of the corresponding magnet between the opposite poles of the corresponding magnet, respectively. The magnets are each composed of a non-rare earth material having a lower coercivity than a rare earth material. A direction of magnetization of each of the pair of magnets is parallel to the thickness direction of the corresponding magnet. The present disclosure also provides a method of manufacturing such a brushless permanent magnet machine.

22 Claims, 8 Drawing Sheets

(56) References Cited

U.S. PATENT DOCUMENTS

| | | |
|---|---|---|
| 7,051,421 B2 | 5/2006 | Biais et al. |
| 7,204,012 B2 | 4/2007 | Kloepzig et al. |
| 7,796,358 B1 | 9/2010 | Tchekanov et al. |
| 2002/0117904 A1* | 8/2002 | Godkin ............................ 310/12 |
| 2005/0206262 A1* | 9/2005 | Kim et al. ................. 310/156.43 |
| 2005/0225192 A1* | 10/2005 | Kloepzig et al. ......... 310/156.43 |
| 2007/0085436 A1* | 4/2007 | Tajima et al. ............. 310/156.46 |
| 2008/0048517 A1* | 2/2008 | Ochiai et al. ................... 310/218 |
| 2008/0278021 A1* | 11/2008 | Ley et al. ................. 310/156.38 |
| 2009/0108712 A1* | 4/2009 | Holtzapple et al. ......... 310/49 R |
| 2009/0236923 A1 | 9/2009 | Sakai et al. |
| 2009/0261774 A1 | 10/2009 | Yuuki et al. |
| 2009/0267546 A1 | 10/2009 | Maekawa et al. |
| 2009/0302702 A1* | 12/2009 | Pabst et al. ............... 310/156.12 |
| 2010/0060223 A1 | 3/2010 | Sakai et al. |
| 2010/0090640 A1 | 4/2010 | Maekawa et al. |
| 2010/0139333 A1 | 6/2010 | Maekawa et al. |
| 2010/0176679 A1 | 7/2010 | Ichiyama |
| 2010/0201294 A1 | 8/2010 | Yuuki et al. |
| 2010/0242549 A1 | 9/2010 | Hosoito et al. |
| 2010/0253169 A1 | 10/2010 | El-Refaie et al. |
| 2010/0289359 A1 | 11/2010 | Knaian et al. |
| 2010/0327689 A1 | 12/2010 | Sakai et al. |
| 2010/0327787 A1 | 12/2010 | Sakai et al. |
| 2011/0084567 A1 | 4/2011 | Ichiyama |
| 2011/0298313 A1* | 12/2011 | Osborne et al. ................. 310/50 |

FOREIGN PATENT DOCUMENTS

| | | |
|---|---|---|
| JP | 2003-124019 A | 4/2003 |
| JP | 2005-304204 A | 10/2005 |
| JP | 2005-304286 A | 10/2005 |
| JP | 2005-304292 A | 10/2005 |
| JP | 2006-280195 A | 10/2006 |
| JP | 2008-245367 A | 10/2008 |
| JP | 2010-213516 A | 9/2010 |
| JP | 2010-233370 A | 10/2010 |

OTHER PUBLICATIONS

International Search Report and Written Opinion issued Sep. 24, 2012 in corresponding International Application No. PCT/US2012/026897.

* cited by examiner

BRUSHLESS PM MACHINE CONSTRUCTION ENABLING LOW COERCIVITY MAGNETS

RELATED APPLICATION

This application claims the benefit under 35 U.S.C. §119 of U.S. Provisional Patent No. 61/447,280 filed on Feb. 28, 2011, the entire contents of which are hereby incorporated by reference in their entireties.

FIELD

The present disclosure relates to the field of brushless machine architectures. More particularly, the present disclosure relates to an architecture or construction of a brushless permanent magnet (PM) machine or PM synchronous machine that enables the use of low coercivity magnets, such as Aluminum Nickel Cobalt (AlNiCo) or Iron Cobalt Tungsten (FeCoW), for example.

BACKGROUND INFORMATION

Induction machines and wound-field machines are two types of high power propulsion technologies that do not rely upon rare earth magnets. Both technologies consume power to create their magnetic fields and both have, to date, been bypassed in favor of permanent magnet machines (e.g., the hybrid automobiles built by Toyota®, Honda®, GM®, Ford® and Chrysler®, the extended-range electric vehicle built by GM®, and the electric vehicle built by Nissan®, all of which being built by the filing date of the present disclosure). The PMs incorporated in the aforementioned vehicles utilize rare earth materials because of the high coercivity of the rare earth materials. However, the price of rare-earth materials has proven to be volatile, leading to a desire for alternatives to these materials.

SUMMARY

Exemplary embodiments of the present disclosure provide a permanent magnet machine with the properties of rare earth machines, without utilizing the rare earth materials. For instance, exemplary embodiments of the present disclosure provide a PM machine architecture which can deliver high performance without the use of rare earth permanent magnets. The exemplary PM machine architecture includes a rotor geometry that allows the use of lower energy magnet material, such as AlNiCo and FeCoW, for example. These magnetic materials are not currently adopted because of low coercivity when compared to rare earth magnets. This translates into the potential for demagnetization in high power machines, and the material is unusable in current machines due to this limitation. However, the exemplary PM machine architecture of the present disclosure includes a unique geometrical arrangement that keeps the operating flux of these magnets at a higher flux density than any other known architecture. By operating near the peak flux density of these magnets (e.g., the residual induction), low coercivity becomes acceptable.

An exemplary embodiment of the present disclosure provides a brushless permanent magnet machine which includes an essentially circular shaped rotor, and at least a pair of magnets arranged in the rotor (multiples of two). The term "essentially circular", as used herein, means a degree of variance (e.g., +/−5%) along the contour of the inner or outer diameter of the rotor due to manufacturing tolerances. Each of the magnets is substantially U-shaped and has a thickness direction extending along a contour of the corresponding magnet between the opposite poles of the corresponding magnet, respectively. The magnets are each composed of a non-rare earth material having a lower coercivity than a rare earth material. A direction of magnetization of each of the magnets is parallel to the thickness direction of the corresponding magnet.

An exemplary embodiment of the present disclosure provides a method of manufacturing a brushless permanent magnet machine. The exemplary method includes arranging the magnets in a rotor that is essentially circular shaped. The exemplary method also includes forming each of the magnets to be a U-shape with a thickness direction extending along a contour of the corresponding magnet between the opposite poles of the magnet, respectively. In addition, the exemplary method includes forming each of the pair of magnets to be composed of a non-rare earth material having a lower coercivity than a rare earth material, such that a direction of magnetization of each of the pair of U-shaped magnets is parallel to the thickness direction of the corresponding magnet.

BRIEF DESCRIPTION OF THE DRAWINGS

Additional refinements, advantages and features of the present disclosure are described in more detail below with reference to exemplary embodiments illustrated in the drawings, in which.

In the drawings, similar components or similarly-functioning components are denoted with the same reference number.

Figure 1A:
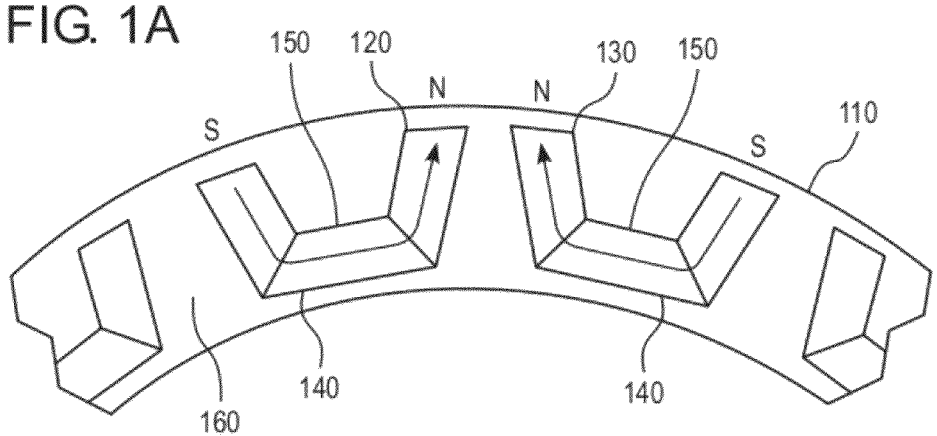
FIG. 1A illustrates a fragmentary cross-sectional view of a PM machine construction according to an exemplary embodiment of the present disclosure.

Various features depicted in the drawings are not drawn to scale for better understanding of the features of the present disclosure.

DETAILED DESCRIPTION

FIG. 1A illustrates a fragmentary cross-sectional view of a PM machine construction according to an exemplary embodiment of the present disclosure. FIG. 1A contains a partial view of a permanent magnet rotor 110 (rotor core) that is rotatably mounted on a motor shaft. The permanent magnet rotor 210 is essentially circularly shaped. The motor shaft is arranged inside of the inner circumference of the rotor 110, and a stator is arranged around or in proximity to the outer circumference of the rotor 110. The motor shaft and stator are known and are therefore not illustrated.

The fragmentary view of FIG. 1A illustrates a pair of magnet 120, 130 arranged in the rotor 110. According to an exemplary embodiment, a plurality of pairs of magnets 120, 130 extend throughout the rotor core 110, such that a plurality of pairs of magnets 120, 130 are contained throughout the essentially circular shape of the rotor 110. In the exemplary embodiment illustrated in FIG. 1A, the pair of magnets 120, 130 are arranged adjacent to each other along the circumference of the rotor 210. Each of the magnets 120, 130 has a U-shaped configuration having a radially inward side 140 on the side of the magnet pointing in the direction of the motor shaft, and a radially outward side 150 on the side of the magnet pointing in the direction of the stator. Surrounding each pair of magnets 120, 130 in the rotor core is a low-permeability, low-conductivity material 160. In the exemplary configuration of FIG. 1A, the pair of magnets 120, 130 are adjacent to each other along the contour of the rotor 110, but the material 160 is disposed between the magnets 120, 130. However, the present disclosure is not limited to this configuration, as will be illustrated in exemplary embodiments described blow. As used herein, a low-permeability, low-conductivity material means any material which has low-conductivity and is non-ferromagnetic. Examples of such materials include plastics, epoxies, polymers, fiberglass, carbon fiber, etc. The present disclosure is not limited to these examples. The material 160 provides a nonmagnetic support structure to eliminate flux leakage and to eliminate the need for rotor magnetic back-iron due to the magnetization direction of the pair of magnets 120, 130.

As illustrated in the exemplary embodiment of FIG. 1A, the pair of magnets 120, 130 have a common pole on the sides of the magnets 120, 130 which are adjacent to each other, such that the poles of the pair of magnets 120, 130 are the same on the respective portions of the pair of magnets 120, 130 which are adjacent to each other. Accordingly, the pair of magnets 120, 130 have an oppositely arranged polarity with respect to each other. For instance, in the example of FIG. 1A, the left magnet 120 has a south (S) pole on the left side of the U-shaped magnet 120 and a north (N) pole on the right side of the U-shaped magnet 120. Conversely, the right magnet 130 has a S pole on the right side of the U-shaped magnet 130, and a N pole on the left side of the U-shaped magnet 130. The present disclosure is not limited to the designation of poles utilized in FIG. 1A. For instance, the polarities of the pair of magnets 120, 130 can be reversed, provided that the sides of the pair of magnets 120, 130 which are adjacent to each other have the same poles.

Each of the pair of magnets 120, 130 has a thickness direction extending along the contour of the corresponding magnet between the opposite poles of the corresponding magnet, respectively. The arrows illustrated in FIG. 1A represent the respective thickness directions and magnetization directions of the pair of magnets 120, 130.

The permanent magnets (e.g., magnets 120, 130) are low coercivity magnets, such as AlNiCo or FeCoW, for example. These materials are considered to be non-rare earth materials, in contrast to the materials used in manufacturing known PMs. Known PM techniques utilize rare earth materials for the magnets, such as Neodymium Iron Boron (NdFeB) and Samarium Cobalt (SmCo), for example. By utilizing such low coercivity magnets, the permanent magnets (e.g., 120, 130) of the present disclosure each have a direction of magnetization that is parallel to the direction of thickness of the thickness direction of the corresponding magnet. Accordingly, with reference to the exemplary embodiment of FIG. 1A, the directions of magnetization of the pair of magnets 120, 130 are shown by the respective arrows. Therefore, the direction of magnetization of magnet 120 is parallel to the thickness direction of magnet 120 represented by the arrow extending from the south pole to the north pole in magnet 130. Similarly, the direction of magnetization of magnet 130 is parallel to the thickness direction of magnet 130 represented by the arrow extending from the south pole to the north pole in magnet 130.

Therefore, the direction of magnetization of magnets 120, 130 is different than the direction of magnetization of known PM machines utilizing rare earth materials as the material of the magnets. This is because the direction of magnetization in known permanent magnets utilizing rare earth materials is normal (e.g., perpendicular) to the thickness direction of the corresponding magnet.

Figure 1B:
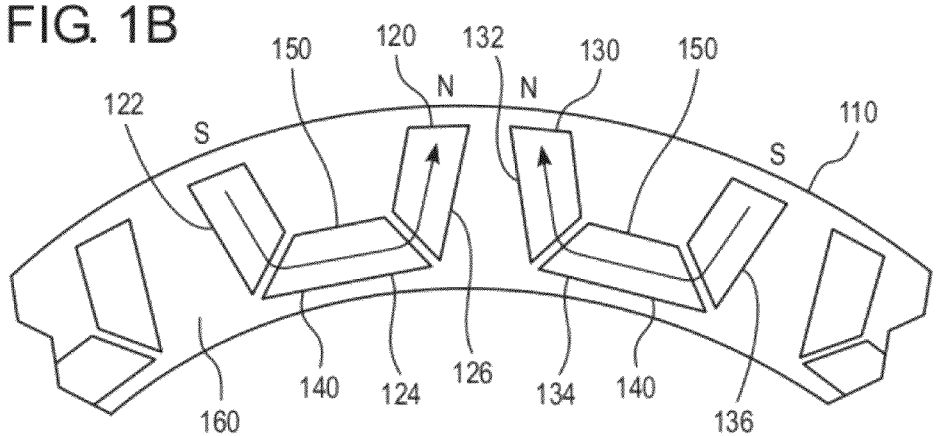
FIG. 1B illustrates a fragmentary cross-sectional view of a PM machine construction according to an exemplary embodiment of the present disclosure.

In the exemplary embodiment illustrated in FIG. 1A, the pair of magnets 120, 130 are each respectively illustrated as a continuous and/or joined structure. The present disclosure is not limited thereto. For instance, one or more of the magnets 120, 130 in any corresponding pair of magnets in the rotor 110 may be segmented into multiple cross-sectional pieces of the corresponding magnet. For example, as illustrated in FIG. 1B, magnets 120, 130 are each respectively composed of three separate trapezoidal pieces (i) 122, 132, (ii) 124, 134, (iii) 126, 136 that are, similar to FIG. 1A, magnetized parallel to the thickness of the respective magnets. The magnets in the pair do not have to be segmented in the same number of cross-sectional pieces as each other. For example, magnet 120 could be segmented in two pieces (e.g., (i) 122 and (ii) 124 joined to or made continuous with 126), while magnet 130 is segmented into three pieces (e.g., (i) 132, (ii) 134 and (iii) 136). Furthermore, one of the magnets of the pair may be continuous and/or joined as illustrated in FIG. 1A, while the other magnet of the pair can be segmented into two or more pieces, as illustrated in FIG. 1B. It is important to note that despite whether one or more of the magnets in the corresponding pair is continuous and/or joined together or segmented into multiple separate pieces, each of the magnets of the corresponding pair is magnetized parallel to the thickness of the respective magnets in the pair.

Figure 2:
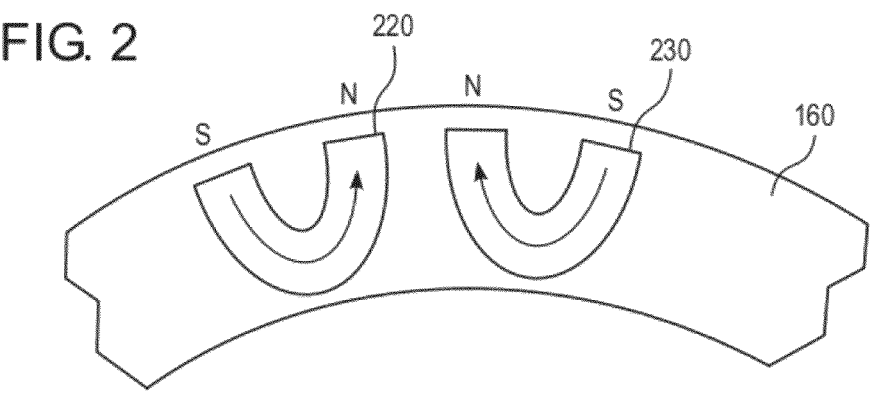
FIG. 2 illustrates a fragmentary cross-sectional view of a PM machine construction according to an exemplary embodiment of the present disclosure.

FIG. 2 illustrates a fragmentary cross-sectional view of a PM machine construction according to an exemplary embodiment of the present disclosure. The exemplary embodiment illustrated in FIG. 2 presents a modification to the exemplary embodiment illustrated in FIG. 1A. In particular, the contour of the pair of U-shaped magnets 220, 230 is more rounded than the contour of the U-shaped permanent magnets 120, 130 illustrated in FIG. 1A. However, the same effects are achieved in the permanent magnets illustrated in FIG. 2 as in FIGS. 1A and 1B. For instance, each of the pair of magnets 120, 130 in FIG. 2 has a direction of magnetization parallel to the thickness direction of the corresponding magnet due to the utilization of a low coercivity material for the magnet, such as AlNiCo and FeCoW, for example, and the U-shaped configuration of the magnets.

Figure 3:
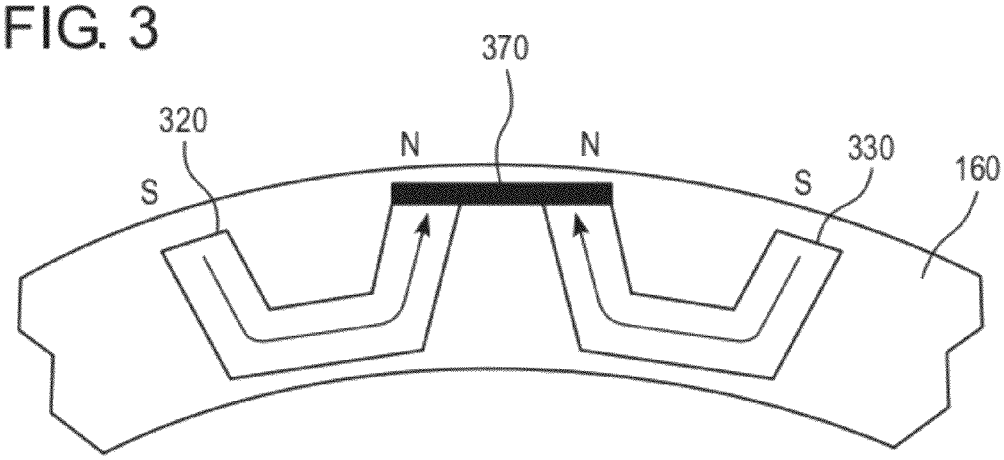
FIG. 3 illustrates a fragmentary cross-sectional view of a pair of magnets in a PM machine construction according to an exemplary embodiment of the present disclosure.
Figure 4:
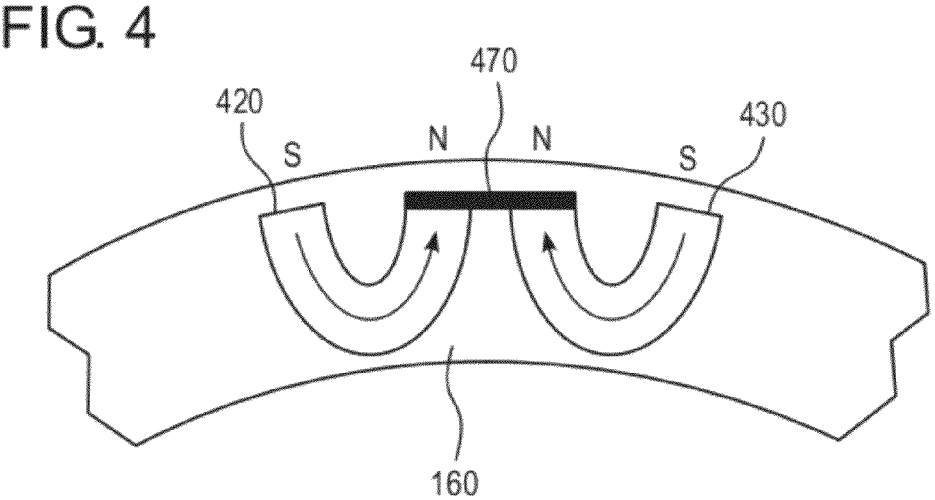
FIG. 4 illustrates a fragmentary cross-sectional view of a pair of magnets in a PM machine construction according to an exemplary embodiment of the present disclosure according to an exemplary embodiment of the present disclosure.

FIGS. 3 and 4 illustrate fragmentary cross-sectional views of a pair of magnets in a PM construction according to exemplary embodiments of the present disclosure. FIG. 3 illustrates a modification of the exemplary configurations of FIGS. 1A and 1B, while FIG. 4 illustrates a modification of the exemplary configuration of FIG. 2. In the exemplary embodiment of FIG. 3, a soft magnetic material 370 replaces the low permeability, low resistivity material 160 above the sides of the pair of magnets 320, 330 which are adjacent to each other. The remaining portions of the magnets 320, 330 are constituted by the hard non-rare earth material AlNiCo and FeCoW, for example. The magnetic material 370 serves as an N pole for the magnets 320, 330 in the example of FIG. 3. The material 160 fills the remaining portions of the rotor not occupied by the magnets 320, 330 and the magnetic material 370. Similarly, in the example of FIG. 4, the soft magnetic material 470 serves as the N pole for the hard non-rare earth pair of magnets 420, 430 having a rounder U-shape. The magnetic material 370, 470 in the examples of FIGS. 3 and 4 may be constituted by a material such as iron, silicon-steel and nickel-iron, or alloys thereof, for example. In the examples of FIGS. 3 and 4, the same effects are achieved in the permanent magnets illustrated in FIGS. 3 and 4 as in the above-described exemplary embodiments. For instance, each of the corresponding pair of magnets 320, 330 and 420, 430 in FIGS. 3 and 4 has a direction of magnetization parallel to the thickness direction of the corresponding magnet due to the utilization of a low coercivity material for the magnet, such as AlNiCo and FeCoW, for example, and the U-shaped configuration of the magnets.

Figure 5A:
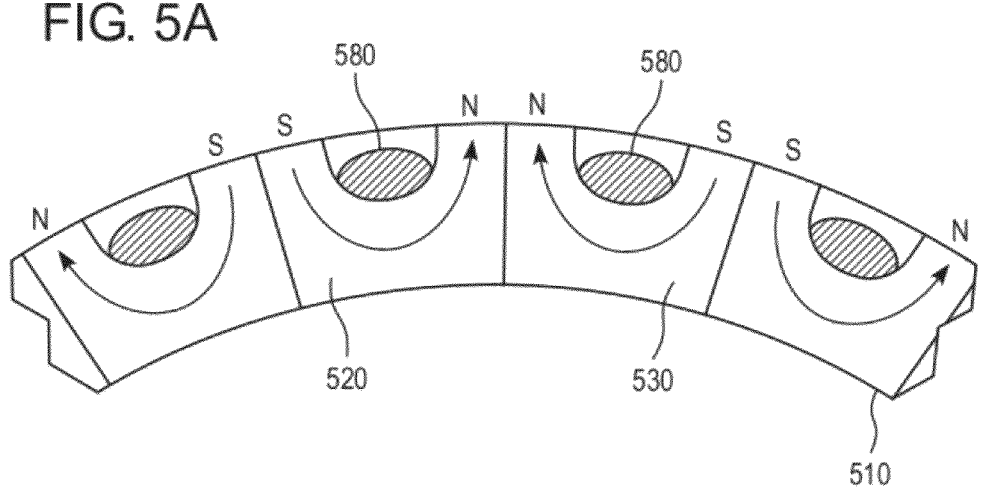
FIGS. 5a and 5b illustrate a fragmentary cross-sectional view of a PM machine construction according to exemplary embodiments of the present disclosure.
Figure 5B:
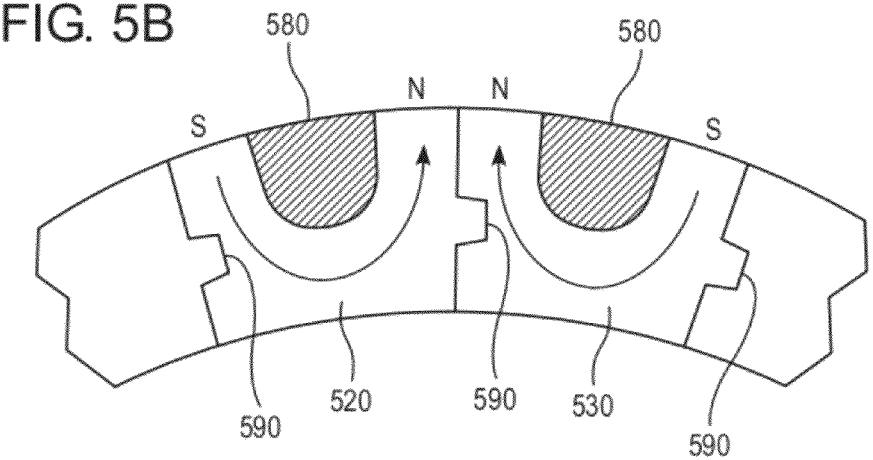

FIGS. 5a and 5b illustrate fragmentary cross-sectional views of a PM construction according to exemplary embodiments of the present disclosure. In the exemplary embodiment illustrated in FIGS. 1A and 1B, for example, it was described that the material 160 separates the adjacent pair of magnets 120, 130. The present disclosure is not limited thereto. For example, as illustrated in FIGS. 5a and 5b, non-magnetic retainers 580 can be provided in the inner concave of the U-shaped pair of magnets 520, 530 to secure the magnets 520, 530 in place in the rotor 510. The retainers 580 provided in the inner concave of the U-shaped pair of magnets 520, 530 is any type of non-magnetic material with low permeability, such as aluminum bar, brass bar, stainless steel, titanium, carbon fiber, etc. While the retainers 580 are non-magnetic, they do not need to be non-conductive. Accordingly, the retainers 580 can serve to secure the pair of magnets 520, 530 constituted by the hard non-rare earth material AlNiCo and FeCoW, for example, in place, and thereby avoid the use of the material 160 in the rotor 510, if all corresponding pairs of magnets 520, 530 are intended to be secured to each other. As illustrated in FIG. 5a, it is not necessary for the retainers 580 to be flush with the outer circumference of the rotor 510.

FIG. 5b illustrates another exemplary embodiment in which securing mechanisms can be provided to secure the pair of magnets 520, 530 to each other. In the example of FIG. 5b, male and female mating tabs 590 can be provided in the U-shaped magnets 520, 530 to secure the magnets to each other in the rotor 510. The tabs 590 can be utilized in addition to or as an alternative to the retainers 580. In the example illustrated in FIG. 5b, both the retainers 580 and tabs 590 are provided. It is to be noted that in the example of FIG. 5a, the retainers 580 were not flush with the outer circumference of the rotor 510, while in the example of FIG. 5b they are. The present disclosure is also not limited to the illustrated types of retainers 580 and tabs 590 as illustrated in the examples of FIGS. 5a and 5b. For example, any male extension components and corresponding female receiving components can be utilized to secure the pair of magnets to each other. In the examples of FIGS. 5a and 5b, the same effects are achieved in the permanent magnets illustrated in FIGS. 5a and 5b as in the above-described exemplary embodiments. For instance, each of the corresponding pair of magnets 520, 530 in FIGS. 5a and 5b has a direction of magnetization parallel to the thickness direction of the corresponding magnet due to the utilization of a low coercivity material for the magnet, such as AlNiCo and FeCoW, for example, and the U-shaped configuration of the magnets.

Figure 6A:
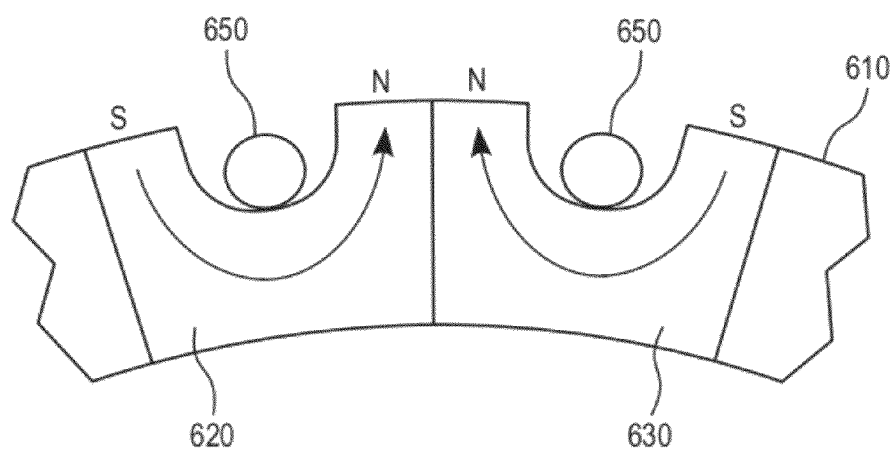
FIGS. 6a-c illustrates a fragmentary cross-sectional view of a PM machine construction including retaining rods and caps, according to an exemplary embodiment of the present disclosure.
Figure 6B:
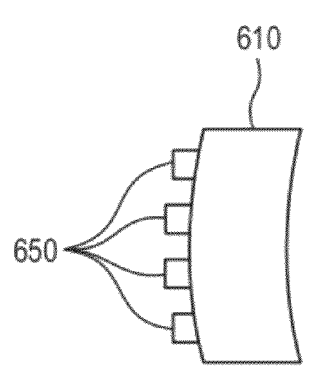
Figure 6C:
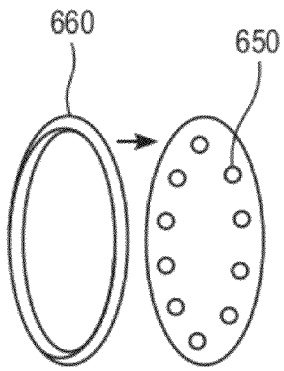

FIGS. 6a-6c illustrate another exemplary embodiment in which retaining rods are used to secure each corresponding pair of magnets 620, 630 arranged in the rotor 610 in the place. As illustrated in FIG. 6a, retaining rods 650 are arranged in the concave portion of the U-shaped pair of magnets 620, 630 to secure the magnets 620, 630 in place. According to an exemplary embodiment, the retaining rods 650 can be provided in one or more of the U-shaped pair of magnets 620, 630 contained in the rotor 610. As illustrated in FIG. 6b, the retaining rods 650 extend out from the inner and/or outer cross-sectional surface of the rotor. Therefore, as illustrated in FIG. 6c, a cap 660 with corresponding mating inserts can be used to engage with the retaining rods 650 on the front and/or backside surface of the rotor 610 and thereby secure the pair(s) of U-shaped magnets 620, 630 in place. In addition, the magnets in the exemplary embodiment of FIGS. 6a-6c may also include interlocking features as illustrated in FIG. 5b. In the examples of FIGS. 6a-c, the same effects are achieved in the permanent magnets illustrated in FIGS. 6a-6c as in the above-described exemplary embodiments. For instance, each of the corresponding pair of magnets 620, 630 in FIGS. 6a-c has a direction of magnetization parallel to the thickness direction of the corresponding magnet due to the utilization of a low coercivity material for the magnet, such as AlNiCo and FeCoW, for example, and the U-shaped configuration of the magnets.

Figure 7A:
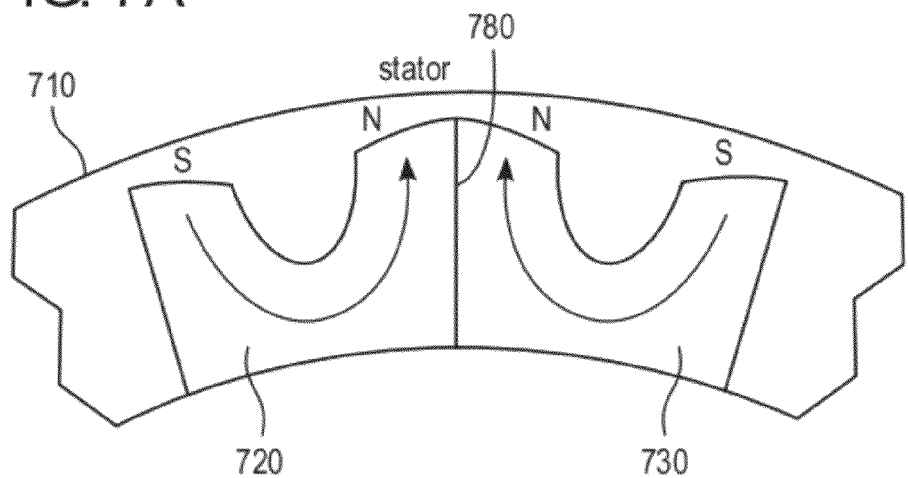
FIGS. 7a and 7b illustrate a fragmentary cross-sectional view of a PM machine construction according to an exemplary embodiment of the present disclosure.
Figure 7B:
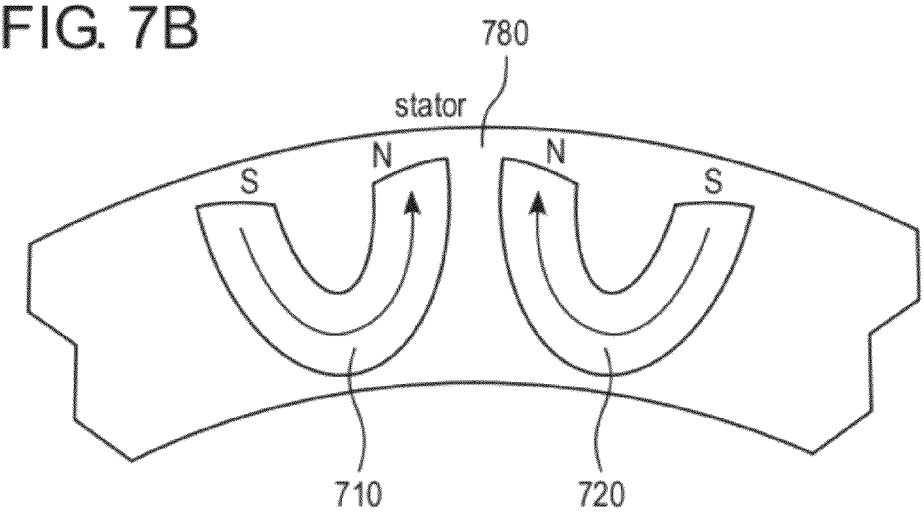

FIGS. 7a and 7b illustrate another exemplary embodiment of the present disclosure in which there is a non-uniform outer diameter, where the area at the interface 780 between the magnets 720, 730 forms a larger rotor assembly diameter than the area adjacent to this interface. FIG. 7a illustrates the situation in which the pair of magnets 720, 730 are physically in contact, while FIG. 7b illustrates the situation where the pair of magnets 720, 730 are not physically in contact. The non-uniform outer diameter illustrated in FIGS. 7a and 7b can apply to any of the above-described exemplary embodiments. In the examples of FIGS. 7a and 7b, the same effects are achieved in the permanent magnets illustrated in FIGS. 7a and 7b as in the above-described exemplary embodiments. For instance, each of the corresponding pair of magnets 720, 730 in FIGS. 7a and 7b has a direction of magnetization parallel to the thickness direction of the corresponding magnet due to the utilization of a low coercivity material for the magnet, such as AlNiCo and FeCoW, for example, and the U-shaped configuration of the magnets.

Figure 8A:
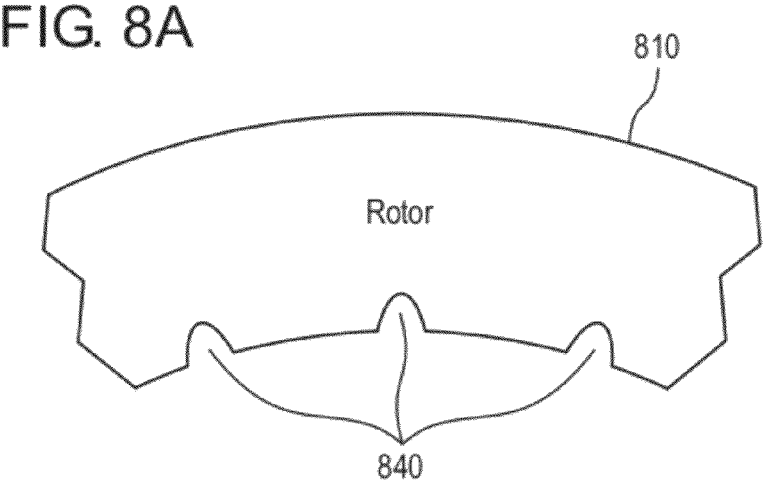
FIGS. 8a and 8b illustrate exemplary features to secure the rotor to a motor shaft.
Figure 8B:
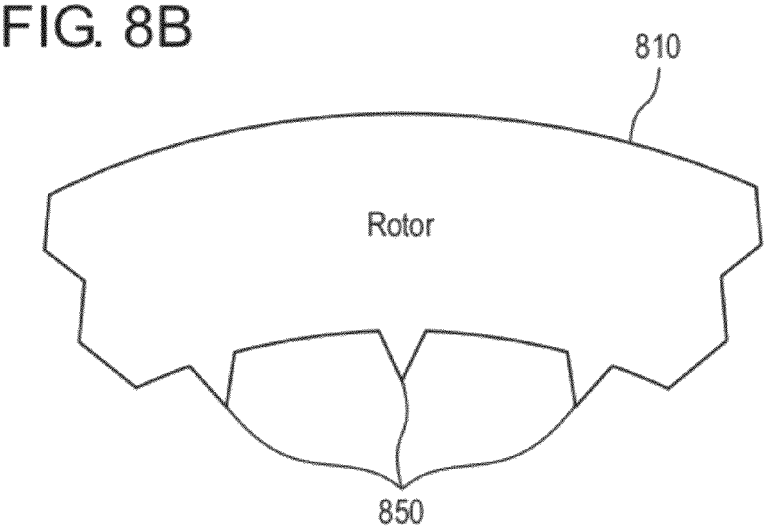

FIGS. 8a and 8b illustrate another exemplary embodiment in which there is a non-uniform inner diameter of the rotor 810 engage the motor shaft. For instance, as illustrated in FIG. 8a, there may be provided tabs 840 on the inner surface of the rotor 810 to receive corresponding protruding engagement parts provided on the outer surface of the motor shafts. On the other hand, as illustrated in FIG. 8b, there may be provided protruding extension components 850 to be mated with corresponding receiving components on the surface of the motor shaft.

Features of any of the exemplary embodiments described above can be combined as it is deemed advantageous.

Figure 9:
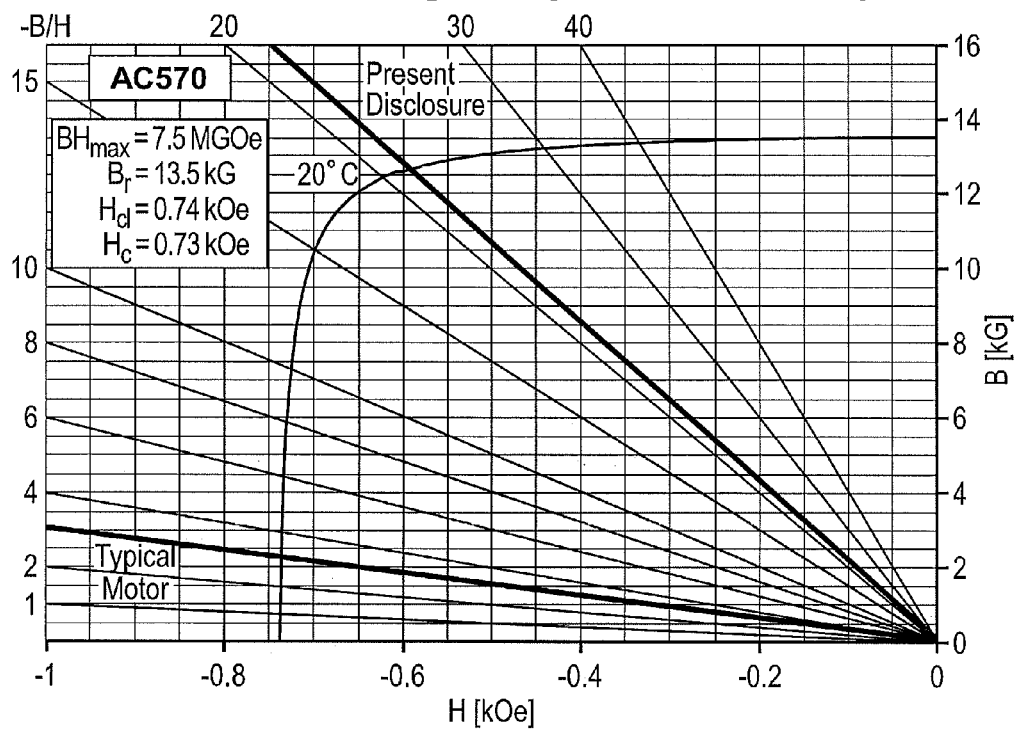
FIG. 9 illustrates a graph showing a permeance coefficient of a PM machine according to an exemplary embodiment of the present disclosure, and a permeance coefficient of a known PM machine.

FIG. 9 illustrates a graph showing a permeance coefficient of a PM machine according to the exemplary embodiments of the present disclosure, and a permeance coefficient of a known PM machine. As described above, the aforementioned exemplary embodiments provide an architecture of a brushless machine, where the architecture includes the following features:

a U-shaped magnet magnetized along the contour (tangentially) rather than through the thickness (normally); and a nonmagnetic support structure to eliminate flux leakage and to eliminate the need for rotor magnetic back-iron due to the magnetization direction In developing this architecture, permanent magnet technologies that can support high air-gap flux densities were first identified. This led to a close look at aluminum-nickel-cobalt (AlNiCo) chemistry, which has a high residual induction flux density (see FIG. 9). The flux density of an AlNiCo magnet is over 13 kilogauss (1.3 Tesla), rivaling an NdFeB magnet. Generally, a NdFeB magnet with sufficient temperature capability has a maximum flux density of 1.1 to 1.2 Tesla, which is lower than a high flux AlNiCo magnet. The challenge and reason that the AlNiCo magnet is not used in electric propulsion motors is the low coercivity (x-axis parameter). This means that the AlNiCo magnet is easy to demagnetize when placed in the magnetic circuit and exposed to fields created by stator armature currents. In a traditional permanent magnet motor, this particular magnet would demagnetize to less than 20% flux, leading to an unacceptable 80% drop in motor torque. On the contrary, the exemplary PM machine architecture of the present disclosure keeps the operating point near the residual induction, above the "knee" of the curve of FIG. 9 so that no demagnetization occurs. At zero load conditions, the attribute that describes this operating point is the permeance coefficient. The permeance coefficient of a traditional permanent magnet motor architecture, either surface-mounted or embedded, is approximately two or three (see the "Typical Motor" load line of FIG. 9). The permeance coefficient of the permanent magnet of the present disclosure is approximately twenty (see the "Present Disclosure" load line of FIG. 9). This is the first key to the approach.

Figure 10:
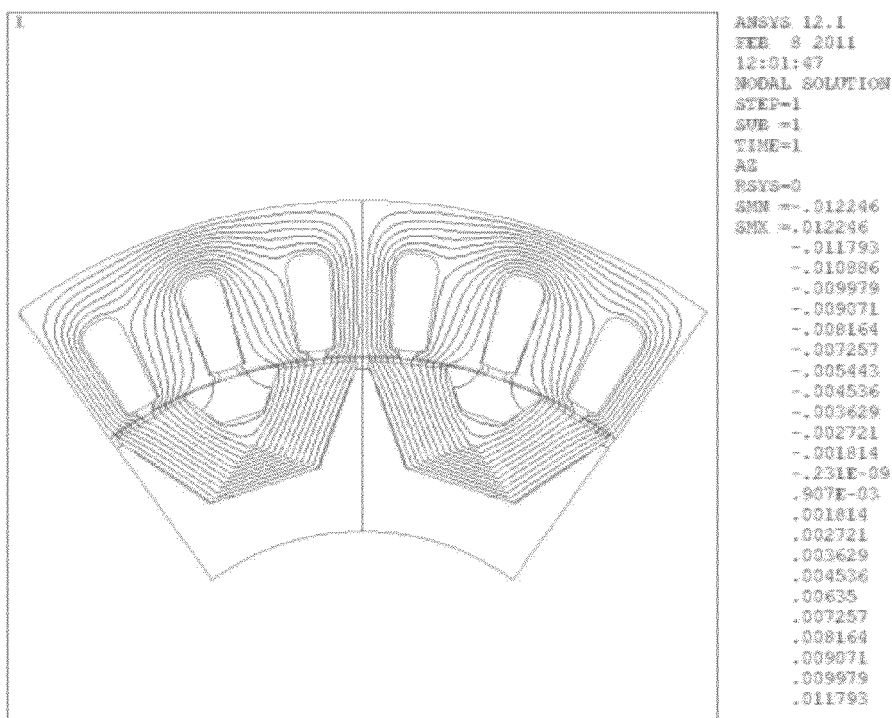
FIG. 10 illustrates a flux plot showing a magnetic direction extending a direction of thickness of a PM machine according to an exemplary embodiment of the present disclosure.

The following describes a permeance coefficient comparison with respect to FIG. 10. This change in operating point occurs due to the innovative rotor geometry and magnetization direction of the magnet. By implementing a curved shape that is magnetized along the tangential direction, the "magnetic thickness" extends from one pole face to the adjacent pole face for a total length that creates this high permeance coefficient. FIG. 10 shows an example of a magnetic circuit that makes this possible. ANSYS finite element analysis was used to design and confirm this attribute. ANSYS is a tool used to design and analyze electric machines and has proven to accurately simulate magnetic circuits. The flux plot shows how the magnetic thickness extends from one pole face to the adjacent and opposite pole face, and combined with a typical magnetic air-gap, creates a high permeance coefficient unique to this architecture. The exemplary PM machine architecture of the present disclosure includes a nonmagnetic rotor support structure, which replaces traditional laminations. The nonmagnetic rotor support structure eliminates flux leakage that would render the design ineffective and also decreases the amount of armature reaction (stator magnetic field magnitude) that would act to demagnetize the permanent magnets. All of the rotor flux created by the permanent magnets flows through the magnet, from one pole face to the next, which is why a nonmagnetic rotor is advantageous.

It will be apparent to one skilled in the art that the architecture of the PM machine or PM synchronous machine as described in the exemplary embodiments above can be used in a number of different, beneficial applications. For example, the exemplary embodiments described above can be utilized in motor and generator applications, among others.

While the present disclosure has been illustrated and described in detail in the drawings and foregoing description, such illustration and description are to be considered illustrative or exemplary and not restrictive. The present disclosure is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A brushless permanent magnet machine comprising:
   a rotor that is essentially circular shaped and having an inner circumference and outer circumference;
   a pair of magnets arranged in the rotor, each magnet of the pair of magnets:
      having a substantially concave contour with a pole at each end of the contour such that each pole is closer to the outer circumference than a region of the magnet between the two poles,
      having a radially outward side arranged closer to the outer circumference of the rotor and an radially inward side arranged closer to the inner circumference of the rotor,
   the radially outward side of each magnet defining a space in the region of the magnet between the two poles in the rotor between the outer circumference of the rotor and the radially outward side of the corresponding magnet, respectively, and
   each of the pair of the magnets having a thickness direction extending along the contour of the corresponding magnet between the opposite poles of the corresponding magnet, respectively; and
   a retaining component provided in each of the spaces in the rotor, each of the retaining components configured to secure a corresponding one of the magnets in place within the rotor, the plurality of retaining components being arranged entirely within the rotor;
   wherein the pair of magnets are each composed of a non-rare earth material having a lower coercivity than a rare earth material, and
   wherein a direction of magnetization of each of the pair of magnets is parallel to the thickness direction of the corresponding magnet.

2. The brushless permanent magnet machine according to claim 1,
wherein the pair of magnets are adjacent to each other in the rotor and have opposite polarities such that sides of the pair of magnets immediately adjacent to each other have the same polarity, and
wherein the direction of magnetization of each of the pair of magnets is toward the sides of the magnets which are immediately adjacent to each other.

3. The brushless permanent magnet machine according to claim 1, wherein the non-rare earth material having a lower coercivity than a rare earth material is one of Aluminum Nickel Cobalt (AlNiCo) and Iron Cobalt Tungsten (FeCoW).

4. The brushless permanent magnet machine according to claim 1, wherein the pair of magnets are surrounded by a material having low permeability and low conductivity.

5. The brushless permanent magnet machine according to claim 4, wherein the material having low permeability and low conductivity has low conductivity and is non-ferromagnetic.

6. The brushless permanent magnet machine according to claim 5, wherein the material having low permeability and low conductivity is selected from the group consisting of plastics, epoxies, polymers, fiberglass, and carbon fiber.

7. The brushless permanent magnet machine according to claim 1, wherein the pole faces of the magnets in the pair are connected by a soft magnetic material in the rotor.

8. The brushless permanent magnet machine according to claim 7, wherein the soft magnetic material is constituted by a material selected from the group consisting of iron, silicon-steel, and nickel-iron.

9. The brushless permanent magnet machine according to claim 1, wherein the retaining components are non-magnetic.

10. The brushless permanent magnet machine according to claim 1, comprising:
an extension component in one of the magnets of the pair and a mating receiving component in the other one of the magnets of the pair to receive the extension component of the one of the magnets.

11. The brushless permanent magnet machine according to claim 1, comprising:
a cap having receiving components corresponding to the retaining rods, wherein the cap is configured to be secured with the retaining rods to secure the rotor.

12. The brushless permanent magnet machine according to claim 1, wherein the rotor has a non-uniform diameter at a portion of the rotor in which the pair of magnets interface.

13. The brushless permanent magnet machine according to claim 1, wherein at least one of the magnets in the pair is constituted by a continuous structure between opposite poles of the at least one magnet.

14. The brushless permanent magnet machine according to claim 1, wherein at least one of the magnets in the pair is segmented into at least two separate pieces.

15. The brushless permanent magnet machine according to claim 1, wherein each magnet of the pair of magnets is U-shaped.

16. A method of manufacturing a brushless permanent magnet machine, comprising:
arranging a pair of a magnets in a rotor that is essentially circular shaped and having an inner circumference and an outer circumference, each magnet of the pair of magnets:
having a substantially concave contour with a pole at each end of the contour such that each pole is closer to the outer circumference than a region of the magnet between the two poles,
having a radially outward side arranged closer to the outer circumference of the rotor and an radially inward side arranged closer to the inner circumference of the rotor,
the radially outward side of each magnet defining a space in the region of the magnet between the two poles in the rotor between the outer circumference of the rotor and the radially outward side of the corresponding magnet, respectively;
forming each of the pair of magnets to have a thickness direction extending along the contour of the corresponding magnet between the opposite poles of the magnet, respectively;
arranging a retaining component in a corresponding one of each of the spaces in the rotor, respectively, each of the retaining components being arranged to secure a corresponding one of the magnets in place within the rotor, the retaining components being arranged entirely within the rotor; and
forming each of the pair of magnets to be composed of a non-rare earth material having a lower coercivity than a rare earth material, such that a direction of magnetization of each of the pair of U-shaped magnets is parallel to the thickness direction of the corresponding magnet.

17. The method of manufacturing a brushless permanent magnet machine according to claim 16, comprising:
arranging the pair of magnets to be adjacent to each other in the rotor and have opposite polarities such that sides of the pair of magnet immediately adjacent to each other have the same polarity and the direction of magnetization is toward the sides of the magnets which are immediately adjacent to each other.

18. The method of manufacturing a brushless permanent magnet machine according to claim 16, wherein the non-rare earth materials having a lower coercivity than a rare earth material is one of Aluminum Nickel Cobalt (AlNiCo) and Iron Cobalt Tungsten (FeCoW).

19. The method of manufacturing a brushless permanent magnet machine according to claim 16, comprising:
surrounding the pair of magnets in the rotor by a material having low permeability and low conductivity.

20. The method of manufacturing a brushless permanent magnet machine according to claim 16, comprising:
connecting the pole faces of each of the pair of magnets by a soft magnetic material in the rotor.

21. The method of manufacturing a brushless permanent magnet machine according to claim 16, comprising:
securing a cap having receiving components corresponding to the retaining rods to the retaining rods.

22. The method of manufacturing a brushless permanent magnet machine according to claim 16, wherein each magnet of the pair of magnets is U-shaped.

* * * * *